United States Patent [19]

Isserlis

[11] 4,344,920

[45] Aug. 17, 1982

[54] AIR POLLUTION CONTROL SYSTEM

[76] Inventor: Morris D. Isserlis, 3655 Poinciana Dr., Apt. 507, Bldg. 7, Lake Worth, Fla. 33460

[21] Appl. No.: 285,852

[22] Filed: Jul. 21, 1981

[51] Int. Cl.$^3$ ............................................. B01D 50/00
[52] U.S. Cl. .................................. 422/169; 55/222; 55/268; 110/215; 110/216; 165/61; 261/155; 261/DIG. 9; 422/173; 422/177; 423/244
[58] Field of Search ............... 422/169, 170, 171, 173, 422/177, 187; 423/244 R; 110/215, 216; 165/61, 66; 55/267, 268, 222; 261/DIG. 9, 155

[56] References Cited

U.S. PATENT DOCUMENTS

| | | | |
|---|---|---|---|
| 2,155,853 | 4/1939 | Anthony, Jr. | 422/169 X |
| 3,436,192 | 4/1969 | Karlsson | 422/169 |
| 4,003,987 | 1/1977 | Paull et al. | 423/244 RX |
| 4,087,250 | 5/1978 | Laue et al. | 422/171 |
| 4,120,669 | 10/1978 | Amendola | 423/244 R X |
| 4,194,889 | 3/1980 | Wanner | 55/267 X |
| 4,198,388 | 4/1980 | Laslo et al. | 422/170 X |
| 4,223,614 | 9/1980 | Barkhaus et al. | 110/215 X |
| 4,256,045 | 3/1981 | Johnson, Jr. | 110/215 X |
| 4,302,425 | 11/1981 | Gamel | 422/169 X |

Primary Examiner—Richard L. Chiesa
Attorney, Agent, or Firm—Robert A. Green

[57] ABSTRACT

The disclosure is of gas-cleaning apparatus comprising a chamber having a downwardly vertical gas and fluid flow path, with the gas and fluid moving at high velocity. One or more layers of solids is disposed across the path of gas and fluid flow, and these solids and the spaces between them act as multiple venturi scrubbers and impingement surfaces so that the gas is cleaned by agglomeration and absorption. A vibrator is coupled to the layers of solids for vibrating them to prevent matter removed from the gas from adhering thereto and blocking the passages therebeween.

Also disclosed is a centrifugal cyclone separator, adapted to be coupled to the output of the above-described gas scrubber, comprising an upright chamber containing a rotatable cylinder carrying blades on its outer surface, the free edges of the blades being positioned close to the inner wall of the chamber. The blade configuration and high rotational velocity and long distance travel of the gases provide improved separating action.

The above apparatus is utilized in a system for converting sulfur dioxide in the clean gas to sulfuric acid.

2 Claims, 3 Drawing Figures

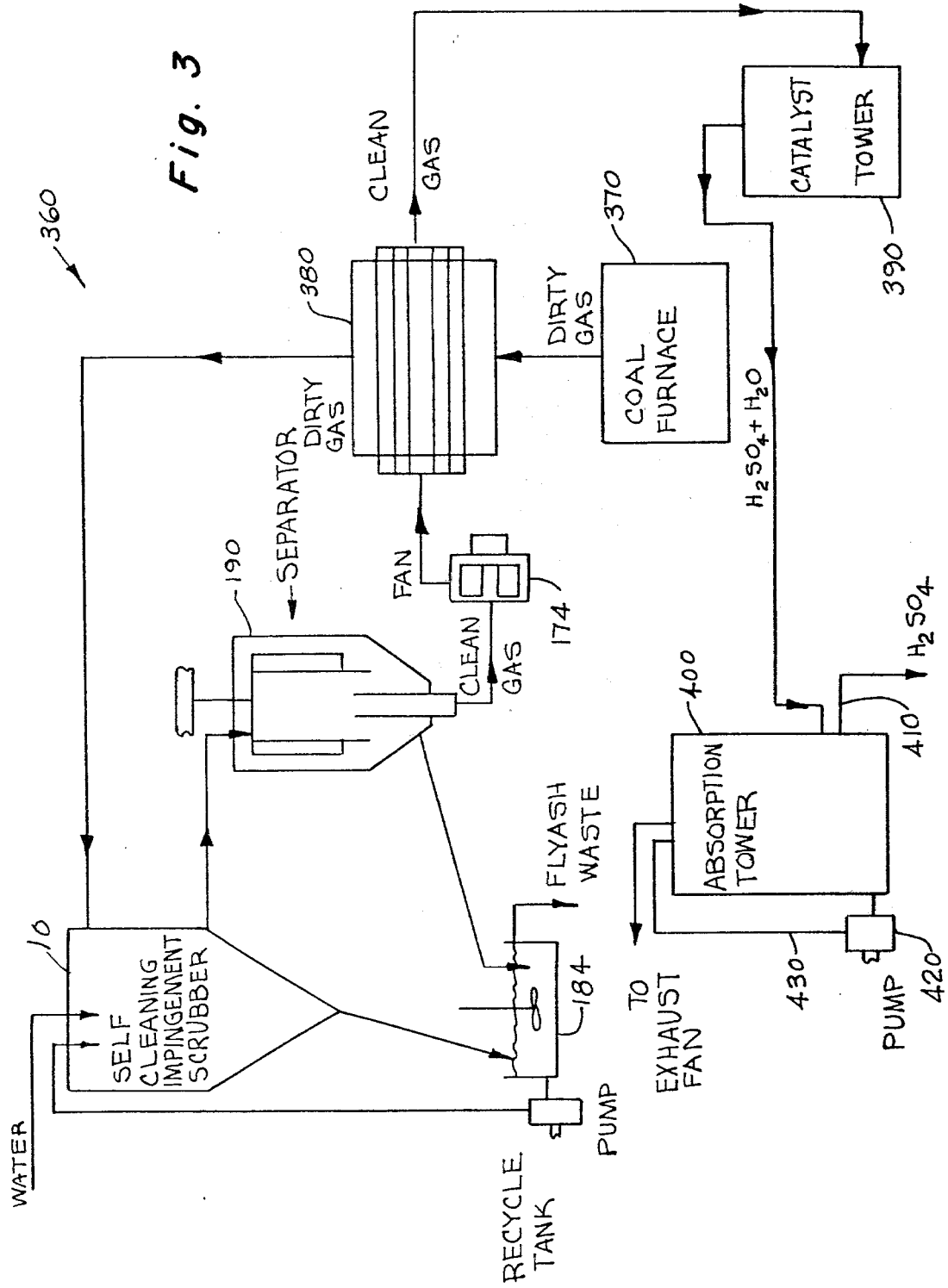

AIR POLLUTION CONTROL SYSTEM

BACKGROUND OF THE INVENTION

In view of the abundance and availability of coal, it would be highly desirable to be able to use coal as a source of energy instead of oil and gas. Because of air pollution and ecology problems due to the difficulty of cleaning out products of combustion, fly ash, mist or fumes, coal is not a completely desirable source of energy, and no completely satisfactory solution to the problem has been suggested up to the present time.

It is well known that venturi scrubbers are effective for removing fine particles from gases. However, as efficient as those devices are, there is a need for even greater efficiency, and this is provided by the present invention, which acts like multiple venturi collectors which operate with a combination of venturi agglomeration and impingement and inertial separation.

The scrubber and other apparatus are used in a system for cleaning gases which are by-products of combustion. DESCRIPTION OF THE DRAWINGS FIG. 1 is a sectional, elevational view of an impingement scrubber embodying the invention;

FIG. 3 is a schematic representation of a system embodying the invention.

DESCRIPTION OF THE INVENTION

The system of the invention 360 uses a wet type, self-cleaning, multiple impingement, particulate collector and agglomerator 10 utilizing high velocity gas and liquid flow for optimum efficiency in performing a gas cleaning operation. This apparatus is described in the above-identified copening application Ser. No. 181,890.

Figure 1:
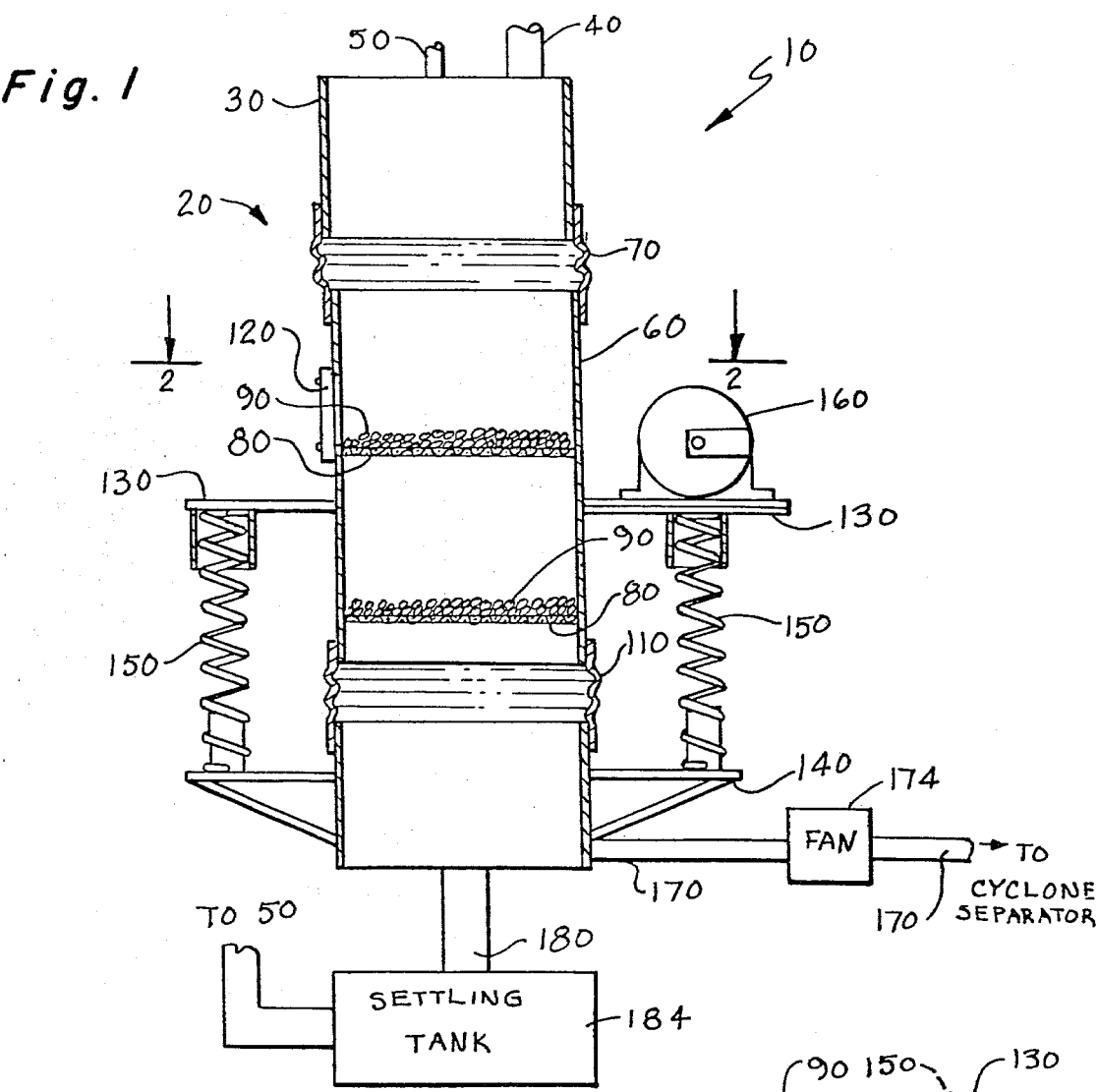
Figure 2:
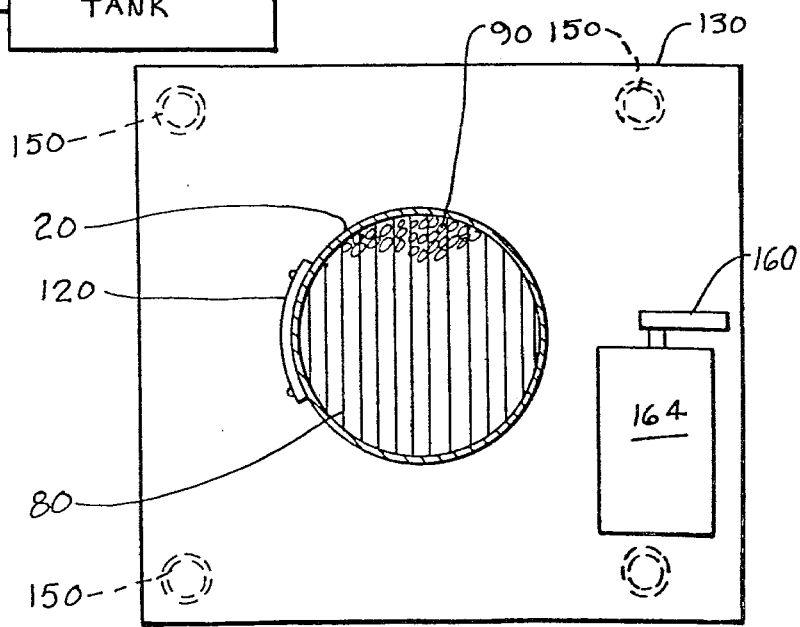
FIG. 2 is a sectional view along the lines 2—2 in FIG. 1.

This apparatus 10, referring to FIGS. 1 and 2, includes a cylindrical tower or chamber 20, of suitable length and diameter, including an upper portion 30 having an intake flue 40 by which the gas to be cleaned is introduced into the chamber 20. An inlet pipe 50 is also provided for introducing a diffuse spray of water or other liquid into this upper portion along with the gas.

The tower 20 also includes an intermediate portion 60 coupled to the upper portion by means of a flexible annular sleeve 70 and carrying internally, at any suitable location, one or more horizontal apertured support plates 80, such as screens, on which are disposed one or more layers of impingement solids hereinafter called a "charge". The charge solids may be spheres or cylinders or the like having smooth surfaces, and they may be of glass, ceramic, or the like. The chamber also includes a lower portion 100 which is also coupled to the intermediate portion by a second flexible annular sleeve 110. The upper, intermediate, the lower portions of the chamber are of any suitable length.

A clean-out door 120 is provided in the intermediate portion 60 to provide access to screens 80 and the charges 90 carried thereby.

A gas outlet flue 170 extends laterally from the lower portion of the tower, and a high speed fan 174 is provided at a suitable location in the outlet flue or in the output of a cyclone separator to be described.

A water outlet pipe 180 also extends from the lower portion of the tower to a suitable reservoir or settling tank 184, from which it can be recycled into inlet pipe 50.

The apparatus 10 includes means for vibrating the intermediate portion 60 of the chamber 20 and thus physically agitating the charge on the screen or screens 80. In the suitable vibrator arrangement, a first horizontal upper platform 130 is secured to the outer surface of the intermediate portion of the chamber, and a similar second lower platform 140 is secured to the lower portion 100 of the chamber, and compression springs 150 are provided, preferably at at least four locations between the two platforms. A vibrator apparatus, for example a motor 164 carrying an unbalanced weight 160, or a suitably shaped cam, is mounted on the upper platform 130, and, as it operates, it vibrates the intermediate portion 60 of the chamber and thus provides the desired vibration of the screens 80 and agitation of all of the solids in charge 90.

In operation of the apparatus of FIG. 1, with the vibrator mechanism turned on, flue gas and water are introduced into the upper portion of the tower through flue 40 and pipe 50. The gas is drawn through the chamber at high speed by fan 174. The contaminants or particulates in the gas and liquid entering the chamber 20 impinge on the solids in charges 90 and agglomerate and are absorbed in the liquid, and this absorbed material is washed through the screens 80 by the water. The water, including agglomerate solids, is directed through outlet pipe 180 to reservoir tank 184, where settling takes place and then the water is recycled, essentially free of solids, into the pipe 50 in the upper portion of the tower. The essentially clean gas with agglomerated particles is removed through discharge flue 170 by fan 174.

It is noted that, in the operation of scrubber 10, the spaces between the solids in charge 90 act like multiple venturi collectors or scrubbers, and, in addition, the solids provide hundreds or even thousands of impact points for the gas which is moving at high velocity. With these factors operating, a homogenizing action occurs, and the gas and its particulate content dissolves in the water, and the particles thus collected become agglomerated.

In the apparatus 10, the solids of charge 90 may have a diameter of about 1 inch or more, as desired, or as large as is practical, and they may be as small as about $\frac{1}{8}$ of an inch in diameter. The vibration distance of the intermediate portion of the chamber 20 may be approximately from about $\frac{1}{8}$ of an inch to about 2 inches, as required under any particular set of parameters.

It is noted that the cleaning solids of charge 90 are selected because they have smooth curved surfaces which are easily cleaned, and shapes such as spheres, ovoids, or cylinders, or the like, and they are made of glass, ceramic, or the like.

As noted, the action of the apparatus 10 is a combination of venturi agglomeration and impingement and inertial separation, and it provides improved particulate collection of particles as small as one micron in diameter by means of:

(1) Multiple, paralled venturi agglomeration by high velocity passage of gases through a bed of small spheres, cylinders, of the like.

(2) Impingement separation and collection through spheres or the like at high velocity.

(3) Self-cleaning of the spheres by vibration.

The apparatus 10 has such efficiency that, with a pressure drop of 24 inches of water, practically any mist or fume can be collected, and an almost invisible stack plume results. For similar results, standard venturi collectors may require up to 80 inches of water pressure drop.

Because some water is entrained in the high-speed gas leaving the apparatus 10 in flue 170, it is desirable to direct the gas from the apparatus 10 to a cyclone centrifugal separator 190, to complete the cleaning of the gas. Suitable cyclone separators are shown in copending application Ser. No. 285,850, filed July 21, 1981 as a division of Ser. No. 181,890.

The outer surface of the rotor cylinder 240 is provided with a plurality of vertical, generally rectangular, blades 280 spaced apart about the cylinder. As an example, eight blades may be provided. The blades 280 are oriented generally in the same direction as the vertical axis of the cylinder 240. The chamber 200 and rotor cylinder 240 are arrayed so that the blades 280 are about four inches wide, and they are spaced about one inch from the inner wall of the cylinder 240.

The lower end of the chamber 200 is coupled to an outlet gas flue 290 which is a pipe having its inner end 292 positioned just above the lower ends 282 of the blades 280. The gas outlet flue 290 is coupled to a suitable fan 294 which may be fan 174 of FIG. 1.

An outlet pipe 300 for solids removed from the gas and liquids is also coupled to the lower end of the chamber 200.

A source of water is coupled to the chamber 200 through pipe 252, in the top wall 250, and the water washes solids out through pipe 300.

The above-described apparatus can be utilized in an improved, simplified and novel system for burning coal, cleaning the gases of combustion by-products, converting $SO_2$ to $H_2SO_4$, and extracting sulfuric acid from the gases.

Such a system 360 is shown schematically in FIG. 3 and includes the impingement scrubber 10 of FIG. 1, coupled to a cyclone centrifugal separator 190. The system 360 includes a coal burning installation 370 which produces hot, dirty gas which is coupled into a heat exchanger 380 which cools the dirty gas and feeds it to the impingement scrubber 10, in which a first cleaning operation is performed as described above. Then the cleaned gas is fed to the centrifugal cyclone separator 190 where the cleaning process is completed.

The clean gas output of the cyclone separator is fed back into heat exchanger 380 where the clean gas is heated. The heated clean gas output of the heat exchanger which is at, for example about 900° F., is then fed into a catalyst tower 390, containing vanadium or other catalyst, where the sulfur dioxide in the gas is converted to sulfuric acid. This operation also generates heat, and the hot sulfuric acid and water, at up to 1200° F., produced in the catalyst tower are fed into a packed tower 400 which serves an absorption and concentrating function on the sulfuric acid. The packed tower has a reservoir level of sulfuric acid in its base and tap means 410 for overflowing sulfuric acid above this level to storage. A pump 420 and pipe 430 are provided to recycle the sulfuric acid in the packed tower to perform the concentrating operation.

The system of FIG. 3 has the advantage that it permits the burning of coal while providing complete removal of fly ash and other particles and producing a clean gas from which sulfur dioxide can be removed as sulfuric acid. In addition, other known systems for cleaning air and removing sulfur dioxide require much more operating apparatus and are quite complex.

Prior art systems such as those of the metallurgical type require cooling towers, drying towers, packed towers, and several heat exchangers not required with the present invention.

Also, the production of acid as a by-product produces revenue instead of the usual costly procedure of neutralizing the gases with lime, with the problem then of disposing of the gypsum sludge produced.

What is claimed is:

1. A coal burning system including means for cleaning the gases of combustion and removing sulfuric acid therefrom, comprising first means for burning coal and producing hot, dirty gas therefrom, the gas containing sulfur dioxide, a heat exchanger having a first input coupled to the output flue of said first means and receiving hot, dirty gas therefrom, second means for removing particulate matter from said gas but not removing the sulfur dioxide, a first output from said heat exchanger for the dirty gas containing sulfur dioxide, said output being coupled to said second means which removes particulate matter from the gas to produce clean gas containing sulfur dioxide, third means coupled between the output of said second means and a second input of said heat exchanger for directing clean gas containing sulfur dioxide thereto, said clean gas being heated in said heat exchanger and fed to a second output therefrom, a catalyst tower coupled to said second clean gas outlet from said heat exchanger for receiving said clean gas containing sulfur dioxide and converting the sulfur dioxide to sulfuric acid.

an absorption tower coupled to the output of said catalyst tower for receiving sulfuric acid therefrom, and means for removing concentrated sulfuric acid from said absorption tower.

2. The system of claim 1 and including means for circulating said sulfuric acid in said absorption tower to concentrate it.

* * * * *